Figure 1:
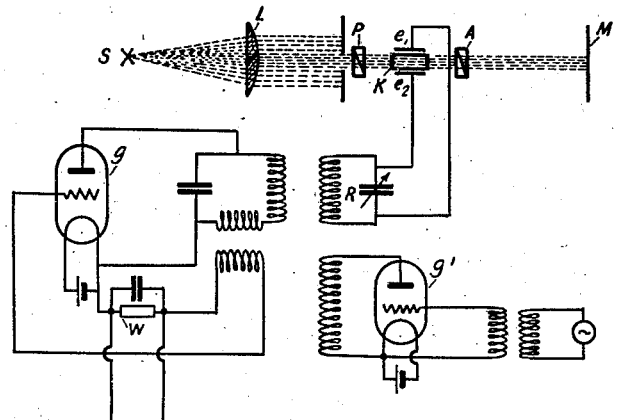

Dec. 11, 1928.  
A. MEISSNER  
1,694,661  
MEANS TO INFLUENCE LUMINOUS RAYS  
Filed Feb. 28, 1927

INVENTOR  
ALEXANDER MEISSNER  
BY  
ATTORNEY

Patented Dec. 11, 1928.

1,694,661

UNITED STATES PATENT OFFICE.

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

MEANS TO INFLUENCE LUMINOUS RAYS.

Application filed February 28, 1927, Serial No. 171,583, and in Germany March 1, 1926.

When luminous rays are passed through an anisotropic crystalline substance, they experience various alterations as regards the states of polarization and the direction of propagation velocity of the waves, according to the direction in which they pass through said substance, in dependence of the structure of the crystal and the orientation of the crystal axis. These phenomena are well known form the optics of crystals, and by the aid of polarizers and analyzers it is possible to ascertain these actions. For a definite position of the polarizing means of the crystal and the kind of light, extinction of rays of a definite wave-length is obtainable, so that the brightness of the intensity of the light issuing from the entire optical apparatus is different from what it was when entering. This is what is called in physics the chromatic polarization of double refraction, or the rotation of the plane of polarization. The optical properties of a crystalline substance change when the crystalline body is subjected to mechanical influence. Tests have shown that an especially marked influence is brought to act upon the optical properties of the crystal when the latter is caused to enter into vibrations, most particularly so when it oscillates at its own natural period or at a higher harmonic thereof.

The present invention starts from the discovery and recognition that, on basis of the dependence of the optical properties of a crystalline body upon its state of oscillation, and it is, therefore, an object of my invention to create and devise means adapted to control the brightness of the penetrating light. The subject matter of my invention, therefore, relates to what may be generally termed a light relay of the type above identified. A relay of this nature is particularly important for photographic light recorders, for instance, for picture transmission and television work, by virtue of the fact that it possesses high sensitivity.

According to the present invention means are so arranged that luminous rays pass through the crystalline substance and that the latter body, by some convenient means, is caused to oscillate, the control of the penetrating light being effected by acting upon the state of oscillation. So far as the generation of oscillations of crystalline substances is concerned, a case that can be easily realized in practice consists in utilizing the piezo-electric effect of a crystal, and in supplying an alternating current potential to the crystal. The oscillations of the crystal will vary in dependence upon the frequency and the intensity of the potential that is supplied, and, in conformity therewith, its optical properties are changed. Such a light-control device may be, therefore, so arranged that a crystal is placed between a polarizer and an analyzer. In this case the crystal is supplied with an alternating current potential by means of two electrodes adjacent the crystal. If, then, the polarizers are so disposed that, with the crystal being unexcited, darkness prevails, brightening up will be produced as soon as the crystal is caused to oscillate. The quantitative control of the brightness can be realized by varying the frequency of the supplied oscillations in dependence upon the natural period of the crystalline body or also by varying its harmonics or, else a further alternative is to control the crystal by varying the intensity of the supplied oscillations.

As regards the nature of the crystalline body, it will be noted that a large number of widely varying crystals can be used, for instance, quartz, turmalin, also the so-called Rochelle salt and it is, therefore, to be understood that my invention is of a general nature and not specific to any one form of crystal, other than to the extent limited by my claims.

By a crystalline body or substance I mean all such materials as are optically anisotropic, either naturally so or by influence of some actions such as mechanical forces, thermal influences, or the like; hence, also bodies with accidental double refraction.

An object of my present invention is, therefore, to produce a means for controlling luminous rays.

A further object is to produce a means for controlling luminous rays by means of crystals.

A still further object is to utilize the different optical properties of crystalline bodies produced by varying conditions of oscillation to control luminous rays.

A further object of my invention is to provide an electromechanical vibrator to control luminous rays.

A still further object of my invention is to produce a means utilizing the piezo-electric effect of crystals to control light in a manner applicable to photographic light recorders for picture transmission and reception and television.

Still other objects of my invention are to provide in a manner hereinafter set forth, a means for controlling luminous rays which is relatively simple in its construction and arrangement, efficient in its use, easily operated, and which may be installed at a minimum expense.

The novel features which I believe to be characteristic of my invention are set forth in the appended claims, and the invention itself, both as to its organization and method of operation, together with further objects and advantages thereof, will best be understood by making reference to the following description when read in connection with the accompanying drawing, wherein I have indicated diagrammatically one form which my invention may assume, to control the luminous brightness.

Figure 2:
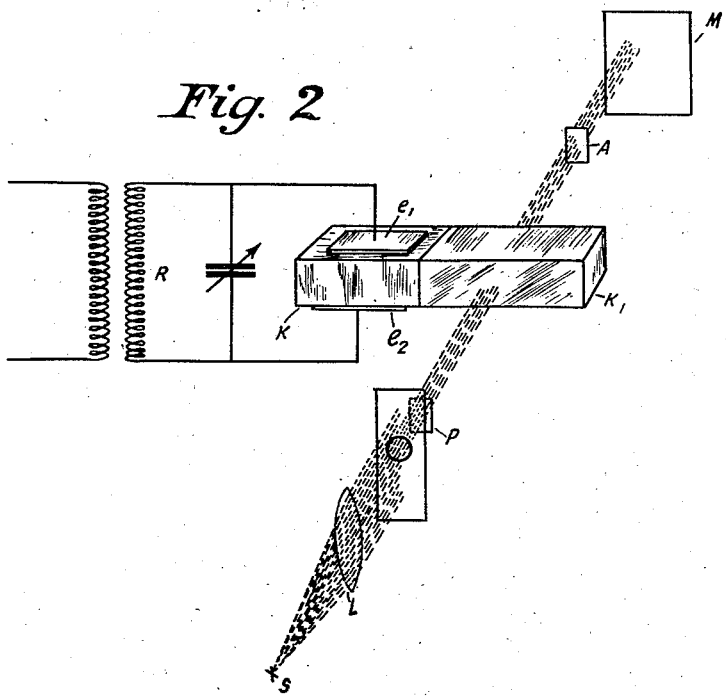

By the accompanying drawings I have shown various forms which my invention may assume, wherein:

Fig. 1 represents an embodiment of the invention using a piezo crystal for passing the light rays; and, Fig. 2, represents modification of Fig. 1 wherein the light rays are passed through a crystal directly associated with the piezo crystal shown in Fig. 1.

To now make reference to Fig. 1 of the accompanying drawing, S indicates a light source, L the lens, P a polarizer, K a crystal, A an analyzer, and M a screen. The light thus travels from the source by way of the optical outfit through the crystal, and from the latter through the analyzer to the screen. In conformity with the invention, the crystal is disposed between two electrodes $e_1$ and $e_2$, and an alternating current potential is supplied to the said electrodes $e_1$ and $e_2$ through a tuned circuit R from an energy source of any preferred form. The energy source may consist, for example, of a generator tube $g$, in which the energy of this generator is influenced by some controlling action, which may be, for instance, reception. For the purposes of diagrammatic illustration, a resistance W is indicated in the grid circuit of tube $g$ to which the control potentials are fed.

The control may be effected also in some other manner, for instance, by varying the frequency of the energy that is supplied which may be accomplished, for instance, by bringing the incoming oscillations to act directly upon an amplifier tube, whence the tuned circuit R is influenced. Such an arrangement is indicated by an amplifier tube $g'$. Hence, there are two possible ways by which it is possible to proceed in order to influence the crystal by electric oscillations, namely, first, by modulation of a constant radio frequency current as indicated by the generator tube $g$, or, secondly, by supplying constant energy, but of different frequency, as indicated by $g'$. It is, however, to be understood that the circuit arrangement herein shown represents merely one embodiment of the basic idea of the invention cited by way of example, and it will be evident that the same is subject to and capable of various modifications, especially in so far as the properties of the optical outfit is concerned; and that the optical arrangement is indicated only in rough diagrammatic outline, for under conditions of practical utilization, it is necessary to provide lens systems, and, if necessary also prisms and other parts, as is well known from research and arrangements used in crystal optics.

For the purposes of optical recording in picture telegraphy and television work, control is effected in conformity with picture-element frequencies The natural period of the crystalline body or substance may be influenced by mechanically coupling another body with this body, as shown by Fig. 2, so that the assembly comprising these two bodies may be regarded as one oscillatory structure with the coupling frequencies being utilized in the excitation. The luminous ray can then be passed either through a piezo-electric substance or else through a body coupled therewith, the actions of mechanical or electrical nature used for the control being brought to act upon the electrical body; or in other words, an arrangement must be chosen of a nature in which the controlling actions (for instance, alternating current potentials) are supplied not directly to the crystalline body through which the luminous rays are made to pass, but to a body coupled therewith.

As shown by Fig. 2, the light ray is passed through the crystal or crystalline substance $K_1$ which is cemented or otherwise suitably fastened to the piezo crystal K, and is subjected to a double refraction action in passing through the crystal $K_1$. It may, therefore, be seen that it is possible to pass the light ray through a substance which is readily permeable to light and which substance of itself does not possess the characteristics of a piezo crystal. Therefore, by cementing or otherwise fastening the crystalline substance, to the piezo crystal, a path which is more permeable to light than that which would be provided by the crystal itself has been made, but at the same time a path in which the light ray is changed in the same manner as if it had been passed through the piezo-electric body. This forms a very material advantage as the light rays are not so much absorbed and the over-all efficiency of the arrangement is much higher.

Having described my invention, I claim:

1. An arrangement for controlling luminous rays which comprises, an electro-mechanical vibrator, means for supplying variations in potentials corresponding to variations in light intensities to said electro-mechanical vibrator, a crystalline substance rigidly associated with said vibrator, a light source, means for polarizing the light issuing from such source and passing said polarized beam of light through said crystalline substance, means provided by said electro-mechanical vibrator rigidly associated with said crystalline substance for producing a physical change in said crystalline substance, whereby the light beam passing therethrough is doubly refracted in accordance with the variation in potential applied to said vibrator, and means for recording the variations in said doubly refracted polarized beam of light as passed through said crystalline substance.

2. A system for controlling luminous rays in accordance with variations in electrical energy which includes, a piezo-electric crystal, means for supplying variations in electrical energy to said crystal, whereby changes in the physical characteristics of the said crystal are occasioned, a crystalline body rigidly associated with said piezo-electric body, a light source, means for polarizing the light beam issuing from said source in a predetermined plane and directing the said polarized light beam through said crystalline body, means provided by variations in the physical properties of said piezo-electric crystal and directly transmitted to said crystalline body for doubly refracting the plane polarized light beams from said source in accordance with the changes in electrical energy introduced into said crystal, and a screen for recording the variations in light passing through said crystalline body.

3. An apparatus for controlling light rays in accordance with variations in electrical energy as produced by variations in light and shade in a picture or facsimile being transmitted which includes, a piezo-electric body and means for supplying said variations of electrical energy thereto, a crystalline body cemented to said piezo-electric body and experiencing changes in the physical properties thereof in accordance with the change produced in piezo-electric body from variations in the said electrical energy supplied thereto, means for passing a polarized beam of light through said crystalline body, means provided by said changes in the physical properties of said crystalline body produced by said variations of potential applied to said piezo crystal for doubly refracting the said polarized light rays passing through said crystalline body, and a screen for recording said changes in the doubly refracted light rays passing through said crystalline substance, whereby an image is recorded on the said screen in accordance with the intensities of light and shade and a picture or facsimile producing said changes in the electrical energy supplied to said piezo-electric body.

ALEXANDER MEISSNER.